United States Patent [19]

Ihara et al.

[11] Patent Number: 4,985,796
[45] Date of Patent: Jan. 15, 1991

[54] MAGNETIC HEAD WITH A TAPE CONTACTING SURFACE HAVING A METAL FILLED CHANNEL THEREIN

[75] Inventors: Keita Ihara; Hiroshi Yohda; Eisuke Sawai; Ken Takahashi, all of Osaka, Japan

[73] Assignee: Matsushita Electric Industrial Co., Ltd., Japan

[21] Appl. No.: 359,312

[22] Filed: May 31, 1989

[30] Foreign Application Priority Data

Jul. 26, 1988 [JP] Japan .................................. 63-185971

[51] Int. Cl.$^5$ ............................................. G11B 5/187
[52] U.S. Cl. ..................................... 360/122; 360/119
[58] Field of Search ......................... 360/122, 119–120, 360/125

[56] References Cited

U.S. PATENT DOCUMENTS 4,799,118  1/1989  Yamada ........................... 360/122 X

FOREIGN PATENT DOCUMENTS 55-42380  3/1980  Japan .
62-33308  2/1987  Japan .
62-271213  11/1987  Japan ................................... 360/122

Primary Examiner—A. J. Heinz
Attorney, Agent, or Firm—Lowe, Price, Leblanc, Becker & Shur

[57] ABSTRACT

There is disclosed herein a magnetic head comprising a ring-like magnetic core composed of first and second magnetic core halves made of a ferrite and held in abutment against each other so as to form a magnetic gap therebetween and an elongated tape-contact surface extending across the magnetic gap. The magnetic core has in the tape-contact surface a channel formed to as to extend in the direction across the magnetic gap and the channel is filled with a magnetic metal material having a high-saturation magnetization. Preferably, the channel has a substantially V-shaped cross section. The magnetic gap exposed on the tape-contact surface is surrounded by the magnetic metal material and non-magnetic glass members provided at both ends of the magnetic gap. The non-magnetic glass members are provided so that the track width is constant from the tape-contact surface to an upper end of a winding hole of the ring-like magnetic core.

2 Claims, 6 Drawing Sheets

MAGNETIC HEAD WITH A TAPE CONTACTING SURFACE HAVING A METAL FILLED CHANNEL THEREIN

BACKGROUND OF THE INVENTION

The present invention relates to a magnetic head for magnetically high-density recording of information on a magnetic recording medium such as a magnetic tape and a method of easily manufacturing the same.

As a recording medium for high-density recording is used a high-coercive medium such as metal tape and as a magnetic head for the high-coercive medium is known a so-called metal-in-gap head (which will be referred to as MIG head). The MIG head comprises first and second core halves each made of a ferrite and held in abutment against each other so as to form a magnetic gap and further includes a magnetic metal material with a high saturation magnetization which is provided only in the vicinity of the magnetic gap. The MIG head shows an excellent recording characteristic because of generation of a strong recording magnetic field from the magnetic metal material during recording and has an excellent reproduction characteristic up to a high-frequency region during reproduction since most of the magnetic path is composed of a ferrite with a small eddy current loss.

Generally, in manufacturing of the MIG head, the magnetic metal material is adhered from the gap surface side of a magnetic core half by means of the sputtering, deposition or the like. The thickness of this magnetic metal material to be adhered is required to be below a predetermined value by taking into account the difference in coefficient of thermal expansion between the magnetic metal material and the ferrite core, degree of the eddy current loss in the magnetic metal material, forming speed of the magnetic metal material, for example.

Generally, when a joint portion between the magnetic metal and the ferrite portion exists in the tape-contact surface of the MIG head, the joint portion between different kinds of magnetic materials is known to act as a pseudo gap resulting in generation of noises. One current method for resolution of this problem involves arranging the joint portion so as not to be parallel to the magnetic gap.

On the other hand, in conventional MIG heads, various problems take place because the magnetic metal material in the vicinity of the magnetic gap is adhered from the gap surface sides of the ferrite core halves thereto by means of the sputtering or the like.

First, the machining, necessary for the removal of affection of noises due to the pseudo gap, is troublesome. That is, for the non-parallel arrangement, the adhesion of the magnetic metal material may be effected, for example, so that the joint portion is obliquely formed with respect to the magnetic gap or formed in zigzags. In these cases, the grinding of the gap surface should be made taking into account the track width, the thickness of the adhered magnetic metal material and so on, thereby resulting in being troublesome in machining.

In the second place, the magnetic metal material is subject to be attached to the back gap of the magnetic head because of adhesion of the magnetic metal material from the gap surface side. With the attachment of the magnetic metal material to the back gap portion, the eddy current loss is particularly increased at only the attached portion so as to lower the reproduction efficiency. Therefore, it is required to remove the magnetic metal material attached to the back gap portion, thereby resulting in increase in machining steps.

The third place is that the thickness of the magnetic metal material to be attached is required to be below a predetermined value whereby the ferrite portion is presented relatively near the magnetic gap and further comes into contact with the track of the recording medium. Generally, the magnetic head starts to come into contact with a magnetic tape with respect to the magnetic gap, and in the conventional MIG heads in which the ferrite portion is positioned near the magnetic gap, since the ferrite portion comes into contact with the magnetic tape even in the case that the contact area between the head and magnetic tape is small, noises tend to be generated due to the sliding movement of the magnetic tape on the head in reproduction. In addition, when the ferrite portion exists within a portion of the tape-contact surface of the head corresponding to the width of a track of the magnetic tape, in recording or reproduction, it has been confirmed that the ferrite portion can produce wide-band modulation noises. Therefore, it is preferable that on the tape-contact surface the ferrite portion extending in the direction perpendicular to the head moving direction does not exist in the vicinity of the magnetic gap.

In the fourth place, in the case of using a magnetic tape which produces a partial abrasion between the magnetic metal material and the ferrite portion even by a slight amount, the MIG head may generate specific noises. This is considered to be due to generation of beating of the magnetic tape in the vicinity of the joint portion because the joint portion between the magnetic metal material and the ferrite portion on the tape-contact surface of the head is presented so as to cross the head-moving direction, and in recording/reproducing noises appear in the vicinity of the carrier frequency in the reproduction spectrum.

For eliminating the above-described problems have been proposed various methods in which the adhesion of the magnetic metal material to the ferrite core is performed from the tape-contact surface side by means of the sputtering or deposition so as not to put a adhesion layer therebetween (for example, as disclosed in Japanese patent provisional publication Nos. 55-42380, 62-33308). However, in these methods, the manufacturing and track-width limiting results in being troublesome and hence actually difficult to provide a MIG head with a structure which provides an excellent electro-magnetic conversion characteristic and allows mass production.

SUMMARY OF THE INVENTION

The present invention has been developed in order to remove the above-mentioned problems and contemplates to provide a magnetic head having an excellent electro-magnetic conversion and having a structure to allow reduction of noise generation and make mass production easy and further provide a manufacturing method which can easily produce the same.

In accordance with the present invention there is provided a magnetic head comprising a ring-like magnetic core composed of first and second magnetic core halves made of a ferrite and held in abutment against each other so as to form a magnetic gap therebetween and an elongated tape-contact surface extending across said magnetic gap, said magnetic core having in said tape-contact surface a channel formed to as to extend in the direction across said magnetic gap and said channel being filled with a magnetic metal material having a high-saturation magnetization, said magnetic gap exposed on said tape-contact surface being surrounded by said magnetic metal material and non-magnetic glass members provided at both ends of said magnetic gap and said non-magnetic glass members being provided so that the track width is constant from said tape-contact surface to an upper end of a winding hole of said ring-like magnetic core.

In accordance with the present invention, there is further provided a magnetic head comprising a ring-like magnetic core composed of first and second core halves made of a ferrite and held in abutment against each other so as to form a magnetic gap therebetween and an elongated tape-contact surface extending across said magnetic gap, said magnetic core having in said tape-contact surface a channel formed to as to extend in the direction across said magnetic gap and said channel having a substantially V-shaped cross section and a laminated member is disposed in said channel, said laminated member being formed by alternately laminating a magnetic metal material having a high-saturation magnetization and an electrical insulating material, and said magnetic gap exposed on said tape-contact surface being surrounded by said laminated member and non-magnetic glass members provided at both ends of said magnetic gap, said non-magnetic glass members being provided so that the track width is constant from said tape-contact surface to an upper end of a winding hole of said ring-like magnetic core.

In accordance with the present invention, there is further provided a manufacturing method of a magnetic head comprising the steps of: forming a plurality of channels on an upper surface of a ferrite block; attaching a magnetic metal material having a high-saturation magnetization to the upper surface of said ferrite block by means of a thin-film forming method such as sputtering or deposition so as to form a combined block where said channels are filled with said magnetic metal material; forming a plurality of division blocks by cutting said combined block in directions crossing said channels; forming at one side notch portions downwardly from an upper surface of said division blocks with respect to joint portions of said magnetic metal material and said ferrite block on said upper surface thereof; putting a glass with a low melting point into said notch portions; machining some of said division blocks to form winding channels in a side surface in the longitudinal direction of said division block; combining the channel-formed division block and a non-formed division block with said winding channel being interposed therebetween and said notch portions of both division blocks facing each other; and cutting the combined block in directions substantially parallel to said channel.

In accordance with the present invention, there is still further provided a manufacturing method of a magnetic head comprising the steps of: forming a plurality of substantially V-shaped channels on an upper surface of a ferrite block; alternately adhering a magnetic metal material with a high-saturation magnetization and an electrically insulating material to the upper surface of said ferrite block by means of a thin-film forming method so as to form a combined block where said V-shaped channels are filled with a laminated member of said magnetic metal material and said insulating material; forming a plurality of division blocks by cutting said combined block in directions crossing said channels; forming at one side notch portions downwardly from an upper surface of said division blocks with respect to joint portions of said laminated member and said ferrite block on said upper surface thereof; putting a glass with a low melting point into said notch portions; machining some of said division blocks to form winding channels in a side surface in the longitudinal direction of said division block; combining the channel-formed division block and a non-formed division block with said winding channel being interposed therebetween and said notch portions of both division blocks facing each other; and cutting the combined block in directions substantially parallel to said channel.

In addition to producing a strong recording magnetic field to attain an excellent electro-magnetic conversion characteristic because of provision of a magnetic metal material with a high saturation magnetization in the vicinity of the magnetic gap and providing an excellent reproduction efficiency since most of the magnetic path is constructed of a ferrite with low eddy current loss, the magnetic head of this invention can provide further advantages. That is, since the magnetic head of this invention has, on its tape-contact surface, a channel formed to be substantially parallel to the head moving direction and a magnetic metal material with a high saturation magnetization is adhered into this channel by means of the sputtering or deposition to be directly attached thereinto without putting a non-magnetic layer such as adhesion layer so that the joint portion between the magnetic metal material and the ferrite portion does not cross the head-moving direction in the vicinity of the magnetic gap, it is not necessary to give countermeasures for the pseudo gap and it is possible to repress generation of noises such as tape-contact noises and modulation noises. In addition, unlike the conventional MIG heads, since the magnetic metal material is adhered from the tape-contact surface side of the ferrite core i.e., the head front side, the magnetic metal material is not attached to the back gap of the head. Furthermore, since the magnetic head according to this invention has notch portions at both ends of the magnetic gap for restricting the track width and the notch portions are filled with a non-magnetic glass such as a low melting point glass, the track width can easily be controlled ranging from the tape-contact surface side to the upper end of the winding hole, as well as bulk ferrite heads.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
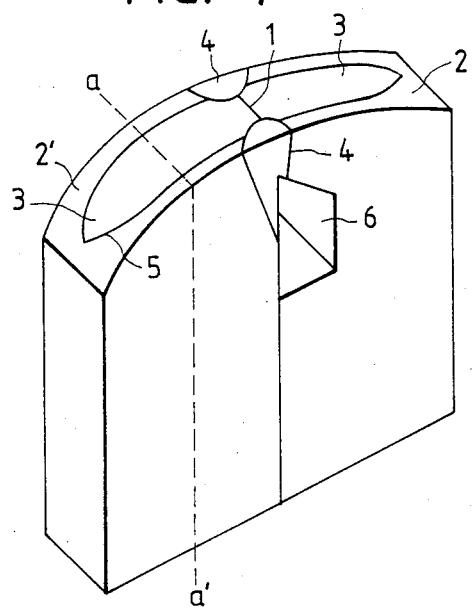
FIG. 1 is a perspective view of a magnetic head according to a first embodiment of the present invention.
Figure 3:
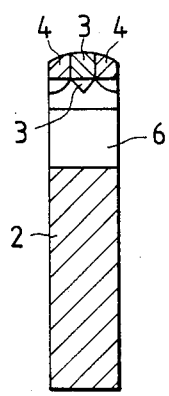
FIGS. 3 and 4 are cross-sectional views of the FIG. 1 magnetic head.
Figure 4:
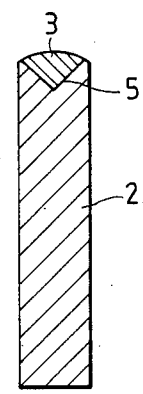

Embodiments of the present invention will be described hereinbelow with reference to the drawings. FIG. 1 is a perspective view of a magnetic head according to a first embodiment of the present invention, FIG. 2 is a top view of the FIG. 1 magnetic head, i.e., shows a tape-contact surface, FIG. 3 is a cross-sectional view of the FIG. 1 magnetic head at its gap surface, i.e., a plan view showing a head core half with a winding hole when viewed from the gap surface side, and FIG. 4 is a cross-sectional view taken along a line a—a' in FIG. 1.

Figure 2:
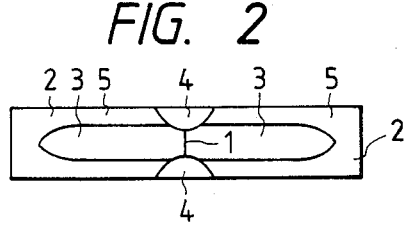
FIG. 2 is an elevational view of the FIG. 1 magnetic head.

The magnetic head of the first embodiment includes a magnetic core made of a ferrite, the magnetic core comprising first magnetic core half 2 and a second magnetic core half 2' which are held in abutment against each other so as to form a magnetic gap 1 therebetween and to have an elongated tape-contact surface illustrated in FIG. 2. In the magnetic head according to the first embodiment, a channel 5 whose cross-section has substantially V-shaped configuration is formed in the tape-contact surface so as to extend in the longitudinal direction of the tape-contact surface, i.e., in substantially parallel with the head-moving direction, and filled with a magnetic metal material 3 with a high saturation magnetization. The magnetic metal material 3 is exposed on the tape-contact surface so as to be surrounded by the ferrite portion. In this case, for the ferrite is used a Mn-Zn or Ni-Zn soft magnetic ferrite, for example, and for the magnetic metal material 3 is used a soft magnetic alloy such as an amorphous alloy, a sendust and permalloy. The magnetic metal material 3 is formed by means of the sputtering or deposition to be adhered into the channel 5 without putting an adhesion or bonding layer therebetween. This can repress increase in the magnetic resistance at the joint portion between the magnetic metal material 3 and the ferrite portion of the magnetic core.

Furthermore, in the magnetic head of the first embodiment, the magnetic core has at both sides two notch portions so as to put the magnetic gap 1 therebetween, which notch portions are filled with a non-magnetic material 4 such as a non-magnetic glass. Thus, the magnetic gap 1 exposed on the tape-contact surface is surrounded by the magnetic metal material 3 and the non-magnetic glasses 4. Both ends of the magnetic gap 1 depend upon the non-magnetic glasses 4 whereby the track width becomes constant from the tape-contact surface to the upper end of a winding hole 6.

Here, the track width is determined so as to be shorter than the width of the magnetic metal material disposed on the tape-contact surface, whereby in the vicinity of the magnetic gap there is not presented a joint portion between the magnetic metal material 3 and the ferrite portion on the tape-contact surface which joint portion forms a pseudo gap and further at a portion relatively near the magnetic gap, there is absent a ferrite portion which crosses the head-moving direction. Therefore, the magnetic head of the first embodiment can have an excellent recording and reproducing characteristics and can reduce various noises.

A manufacturing method of the magnetic head of the first embodiment will be described hereinbelow with reference to FIGS. 5 through 12.

Figure 5:
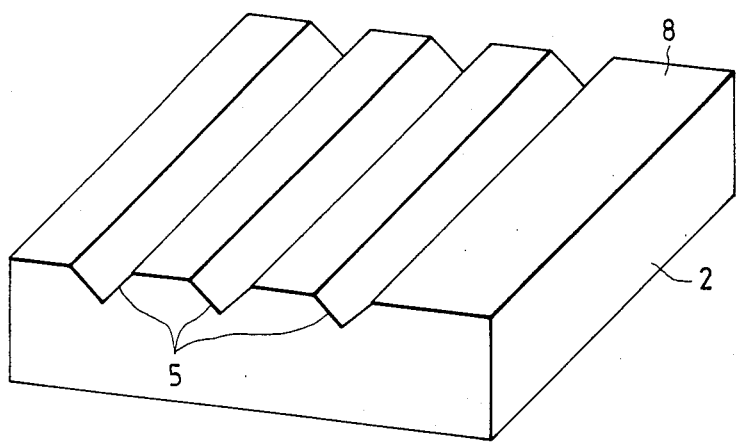
FIGS. 5 through 12 are perspective views showing a manufacturing method of the magnetic head according to the first embodiment of this invention.

The first step will be described with reference to FIG. 5 showing a ferrite block 2 where a plurality of substantially V-shaped channels 5 parallel to each other are formed on an upper surface 8 of the ferrite block by means of a mechanical machining. In this case, the ferrite block 2 is made of a soft magnetic ferrite such as Mn-Zn ferrite and Ni-Zn ferrite which causes easy formation of the substantially V-shaped channels 5.

Figure 6:
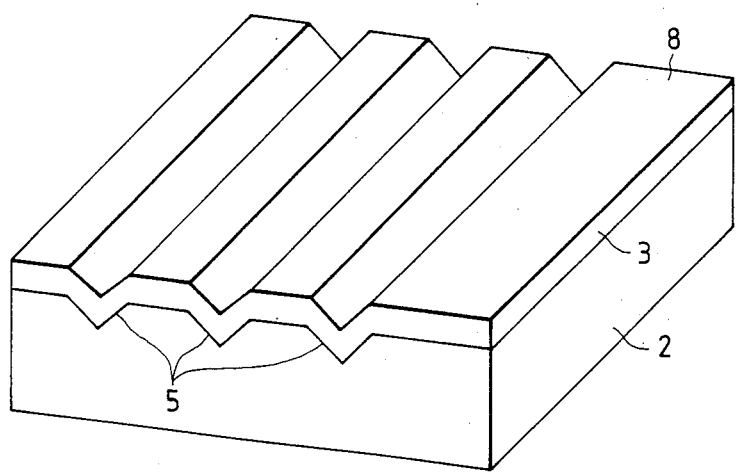
Figure 7:
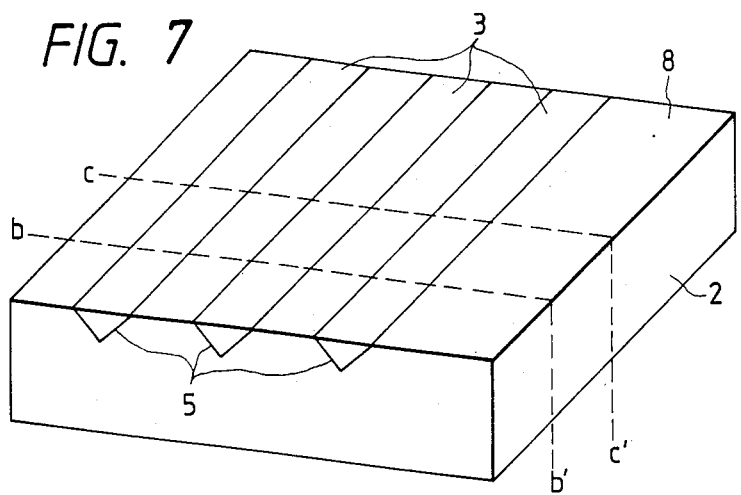

In the second step, as shown in FIG. 6, on the upper surface 8 of the ferrite block with the substantially V-shaped channels 5 by means of the sputtering, deposition or the like is adhered a magnetic metal material 3 with a high saturation magnetization, thereby causing a block combining the magnetic metal material 3 and the ferrite block 2. In this case, for the magnetic metal material 3 is used a soft magnetic alloy with a high saturation magnetization such as an amorphous alloy, a sendust and a permalloy. This step allows the magnetic metal material 5 to fill up the substantially V-shaped channels 5 without putting a adhesion layer therebetween. Thereafter, as shown in FIG. 7, an necessary magnetic metal material adhered to portions other than the substantially V-shaped channels 5 is removed by mechanically grinding with respect to the upper surface 8 of the resultant, or combined, block by using a surface plate or the like. Here, in this instance, the grinding of the upper surface 8 is not always necessary, and it is appropriate that the unnecessary magnetic metal material is removed by tape grinding of the tape-contact surface after cutting to make head chips.

Figure 8:
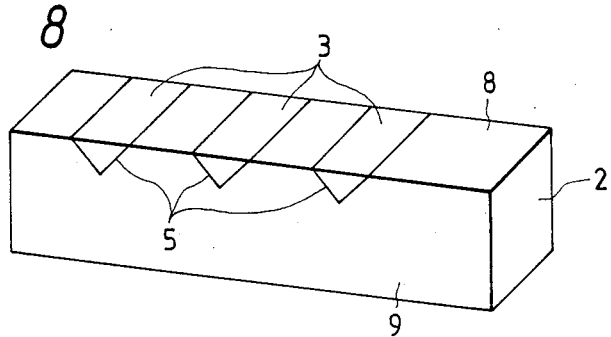

Subsequently, in the third step, as indicated by b—b' and c—c' in FIG. 7, the combined block is mechanically cut in the directions substantially normal to the longitudinal direction of the substantially V-shaped channels 5. With this cutting, a plurality of elongated division blocks can be obtained as shown in FIG. 8.

Figure 9:
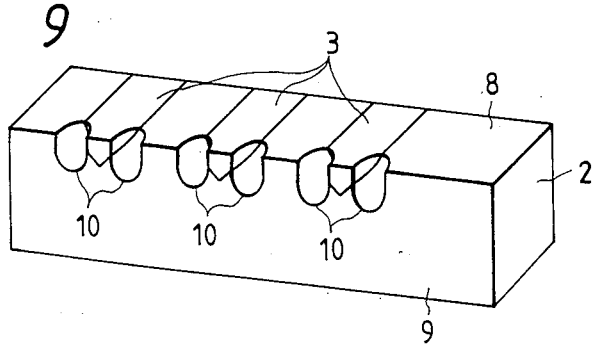

In the fourth step, as shown in FIG. 9, each of the elongated division blocks is, at one side, machined downwardly from the upper surface 8 by a predetermined depth so as to form notch portions 10, resulting in determining the track width. The machining of the notch portions 10 is performed with respect to the boundary portions on the upper surface 8 between the magnetic metal materials 3 and the ferrite portions 2.

Figure 10:
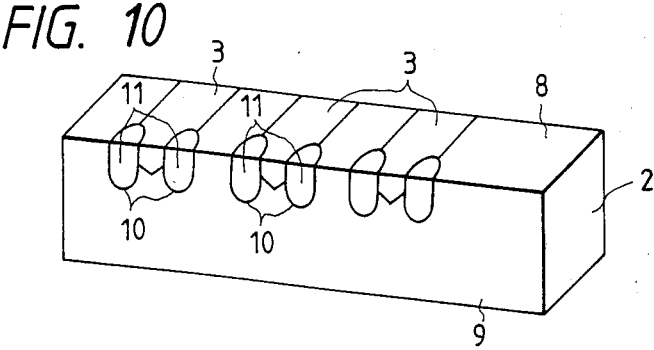

In the fifth step, as shown in FIG. 10, the notch portions 10 are filled with a non-magnetic glass such as a melt low melting point glass 11 which is in turn cooled for coagulation. Thereafter, the side surface 9 of each of the division blocks, in which the notch portions 11 are formed, is grinded so as to become smooth. Here, half the number of the division blocks of FIG. 10 are used as the first core halves 2 (FIG. 1) and the remaining division blocks of FIG. 10 are used as the second core halves 2' (FIG. 1).

Figure 11:
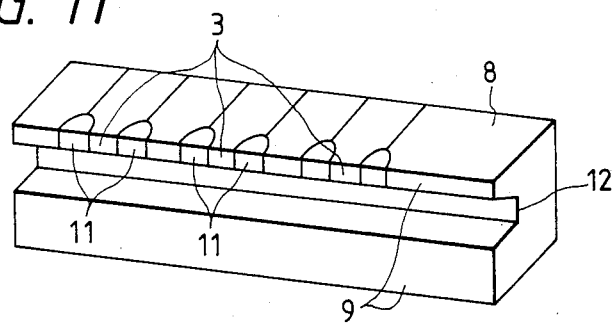

In the sixth step, as shown in FIG. 11, each of the division blocks corresponding to the first core halve 2 are machined so that a channel 12 is formed in the side surface 9 to extend in the longitudinal direction of the division block. The channel 12 is for the winding hole 6 of the magnetic head of FIG. 1. Here, the winding channel 12 is required to be formed so that the width of the magnetic metal material 3 limited by the low melting point 11 becomes constant from the upper end of the winding channel 12 to the upper surface 8, i.e., in the gap depth region.

Figure 12:
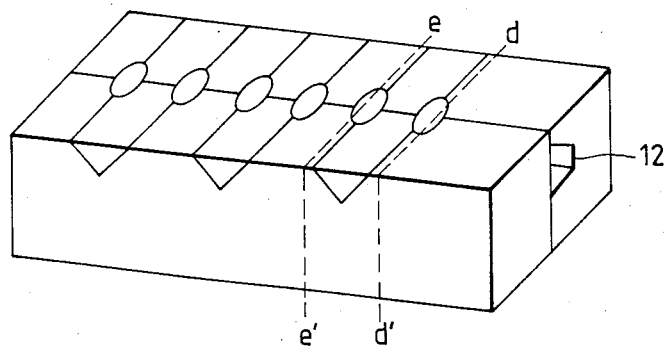

In the seventh step, as shown in FIG. 12, the division block shown in FIG. 10 which corresponds to the second core half 2' and the division block shown in FIG. 11 which corresponds to the first core half 2 are integrally combined with each other with respect to the respective side surfaces 9 with a gap member being interposed therebetween. During this combination, the adhesion therebetween is performed by means of re-melting of the low melting point glass 11 in the notch portions 10 or a low melting point glass used as the gap member.

Finally, cutting is performed along d—d' and e—e' in FIG. 12 so as to obtain a plurality of head chips. The front surface, i.e., tape-contact surface, of the head chip is grinded by a tape so as to attain the magnetic head as shown in FIG. 1.

In the manufacturing method of the present invention described above, the channels 5 are formed on the upper surface of the ferrite block as shown in FIG. 5 and the magnetic metal material 3 is adhered on the upper surface 8 of the ferrite block. In this case, the provision of the channels 5 on the upper surface of the ferrite block depends upon two reasons. In the first place, as compared with the fact that the magnetic metal material 3 is attached without the channels, the contact area of the ferrite portion 2 with the magnetic metal material 3 becomes wider and therefore the magnetic resistance at the joint portion sufficiently becomes small. In the second place, even in the case of using the magnetic metal material 3 different in thermal expansion coefficient from the ferrite portion 2, the magnetic metal material attached to the channel 5 is not easy to be peeled off. As described above, it is advantageous that the magnetic metal material 3 is attached to the ferrite block in which the channels 5 are formed previously.

In addition, in the embodiments described above, the channels formed in the upper surface of the ferrite block have a substantially V-shaped configuration. This depends upon the following reasons.

Figure 16:
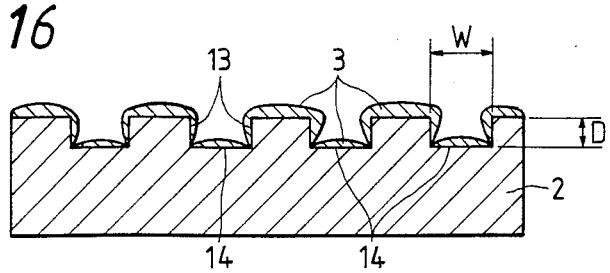
FIGS. 16 through 19 are cross-sectional views for describing adhesion states of a magnetic metal material with respect to channels.
Figure 17:
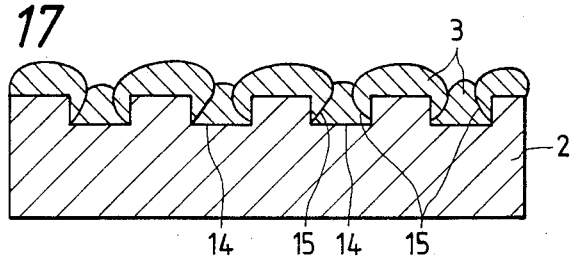
Figure 18:
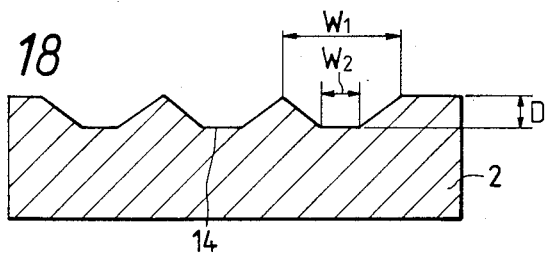
Figure 19:
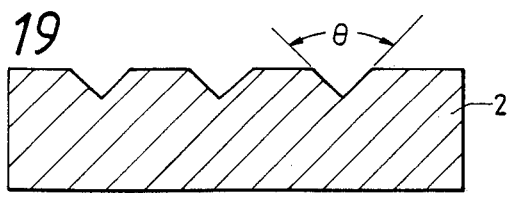

FIGS. 16, 17, 18 and 19 are cross-sectional views for describing the relation between the channel-configuration on the ferrite block and the attachment state of the magnetic metal material 3 by the sputtering or others. Of these figures, FIGS. 16 and 17 are cross-sectional views in the case that the channel whose cross-section is rectangular is formed on the ferrite block. In this instance, when the magnetic metal material 3 is adhered by means of the sputtering or the like, as shown in FIG. 16, the attachment of the magnetic metal material 3 in the channel starts from the channel bottom surface 14 and the channel side surfaces 13, and finally affected portions 15 of the magnetic metal material 3 are formed as illustrated in FIG. 17. The affected portion causes generation of crack and hence exfoliation of the magnetic metal material. In order to relax this phenomenon, although the channel width (W) is required to be wider than the channel depth (D), generally, it is difficult to increase the width (W) of the channel due to limination of the configuration of the magnetic head. Therefore, as shown in FIG. 18, it is effective that the width (Wl) of the channel opening portion is formed to be wider than the width (W2) of the channel bottom surface 14. On the other hand, even if the width (W2) of the channel bottom surface is set to be zero as shown in FIG. 19, it has been found that the effect is the same. Here, in the case of the V-shaped channel, the opening angle ($\theta$) is preferable to greater, i.e., about $\pi/4$ radians or more.

Figure 13:
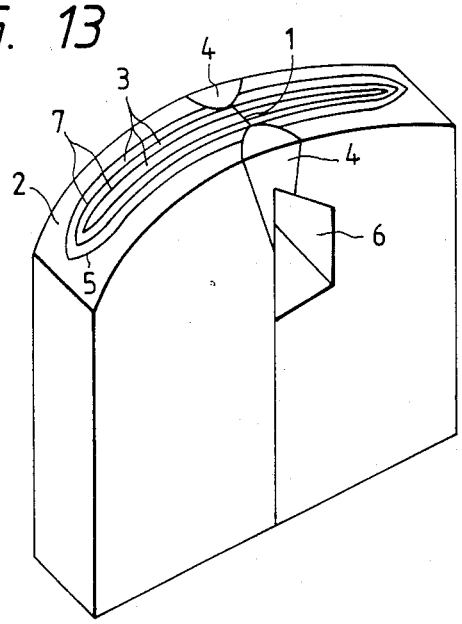
FIG. 13 is a perspective view showing a magnetic head according to a second embodiment of this invention.
Figure 14:
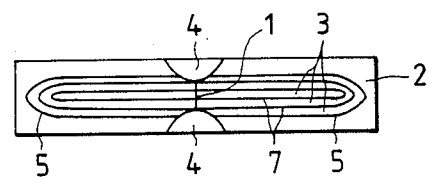
FIG. 14 is an elevational view of the FIG. 13 magnetic head.

Secondly, a second embodiment of a magnetic head according to the present invention will be described hereinbelow. FIG. 13 is a perspective view of a magnetic head according to the second embodiment of this invention and FIG. 14 illustrates an elevational view thereof, i.e., shows the tape-contact surface thereof. Parts corresponding to those in FIGS. 1 and 2 are marked with the same numerals and the description will be omitted for brevity.

In the magnetic head according to the second embodiment, on the tape-contact surface of the magnetic core made of the ferrite is exposed a laminated member which is constructed by alternately laminating a magnetic metal material 3 with a high saturation magnetization and an electrically insulating material 7 such as $SiO_2$. That is, instead of the magnetic metal material 3 provided in the substantially V-shaped channel 5 formed in the tape-contact surface in the first embodiment, the laminated member is provided therein. The provision of the laminated member in the substantially V-shaped channel 5 causes reduction of the eddy current loss, and therefore the reproduction characteristic in the high-frequency region can be improved. Here, in using such a laminated member on the tape-contact surface, the cross-section of the channel 5 is required to have a substantially V-shaped configuration because the tape-contact surface and the surface of the electrical insulating material 7 are not parallel with each other, that is, the electrical insulating material 7 is not exposed widely on the tape-contact surface.

Figure 15:
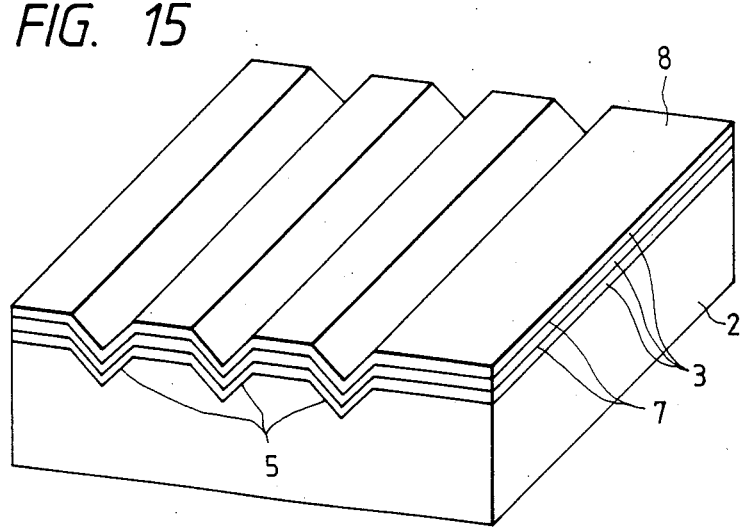
FIG. 15 is a perspective view showing a manufacturing method of the magnetic head according to the second embodiment of this invention.

The manufacturing method of the magnetic head according to the second embodiment of the present invention can be similar to the first embodiment except the step that a laminated member is formed by alternately laminating the magnetic metal material 3 and the electrical insulating material 7. FIG. 15 shows a ferrite block with the laminated member. In FIG. 15, the magnetic metal material 3 with a high saturation magnetization and the electrical insulating material 7 such as $SiO_2$ are alternately adhered on the upper surface 8 of the ferrite 2, in which channels are formed, by means of the sputtering or deposition so as to form the laminated member.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention.

What is claimed is:

1. A magnetic head comprising a ring-like magnetic core composed of first and second magnetic core halves made of a ferrite and held in abutment against each other so as to form a magnetic gap therebetween and an elongated tape-contact surface extending across said magnetic gap, said magnetic core having a channel in said tape-contact surface, said channel extending across said magnetic gap and being filled with a magnetic metal material having a high-saturation magnetization which is directly adhered to said ferrite of said magnetic core, said magnetic gap being surrounded by said magnetic metal material at said tape-contact surface and non-magnetic glass members provided at both ends of said magnetic gap to determine a track width on a magnetic tape on which information is recorded by said magnetic head, the cross section of said magnetic gap being substantially oblong and said channel having a substantially V-shaped cross section.

2. A magnetic head comprising a ring-like magnetic core composed of first and second core halves made of a ferrite and held in abutment against each other so as to form a magnetic gap therebetween and an elongated tape-contact surface extending across said magnetic gap, said magnetic core having a channel formed in said tape-contact surface, said channel extending across said magnetic gap, said magnetic gap having a substantially oblong cross section and said channel having a substantially V-shaped cross section, said channel having therein a laminated member which is directly adhered to a wall of said channel, said laminated member being formed by alternately laminating a magnetic metal material having high-saturation magnetization and an electrical insulating material, and said magnetic gap being surrounded by said laminated member at said tape-contact surface and non-magnetic glass members provided at both ends of said magnetic gap so as to determine a track width on a magnetic tape on which information is recorded by said magnetic head.

* * * * *